3,145,176
ORGANIC MATERIALS STABILIZED WITH A MIXTURE OF THIOBISPHENOL AND DIALKYL PHOSPHONATES
Gordon G. Knapp, Royal Oak, and Harold D. Orloff, Oak Park, Mich., assignors to Ethyl Corporation, New York, N.Y., a corporation of Virginia
No Drawing. Filed Apr. 11, 1960, Ser. No. 21,139
29 Claims. (Cl. 252—48.2)

This invention relates to improved organic material and in particular to the use of a synergistic combination of additives to protect organic material from deterioration.

Organic compositions including hydrocarbon fuels, lubricants and polymers are all subject to oxidative deterioration at elevated temperatures or upon prolonged exposure to the elements. In the case of lubricating compositions, gums and sludges, the corrosion of metal parts with which the oils come in contact, and the loss of lubricating properties result from this deterioration. As to polymeric compositions including natural rubber and polyethylene, oxidative deterioration causes the loss of desirable characteristics as well as an increase in weight. Hydrocarbon fuel compositions are deteriorated by oxygen during storage to form undesirable components in the fuel.

A principal object of this invention is to provide compositions of matter protected against oxidative deterioration. A further object is to provide synergistic compositions of additives which are highly effective in inhibiting the oxidative deterioration of hydrocarbon fuels, oils, greases, and polymeric and other organic compositions. Another object is to provide lubricating oil normally tending to deteriorate in the presence of oxygen containing, in amount sufficient to inhibit such deterioration, novel and highly effective antioxidant combinations. Still another object is to provide organic polymers, particularly polypropylene, stabilized against oxidative deterioration and discoloration by the presence therein of a small quantity of novel and highly effective antioxidant combinations. A still further object is to provide improved antiknock fluids. Another object is to provide stabilized edible material. Other important objects of this invention will be apparent from the following description.

The above and other objects of this invention are accomplished by providing, as new compositions of matter, organic material tending to deteriorate in the presence of air, oxygen, or ozone protected by a small quantity of a mixture of a phenol sulfide and an organic dialkyl phosphonate having hydrogen bonded to phosphorus. In compounding the compositions of this invention, the thiobis phenol is ordinarily employed in concentrations of from about 0.01 to about 5 percent based on the weight of the material to be protected while the organic hydrogen phosphate is employed in concentrations of from about 0.005 to about 1.5 weight percent of phosphorus based on the material to be protected.

Ordinarily when employing the synergistic antioxidant mixtures of this invention it is preferable to use from 0.025 to about 0.5 weight percent of phosphorus along with from 0.2 to about 1 percent by weight of the phenol sulfide employed. These concentration ranges are preferred as synergistic antioxidant effectiveness of outstanding proportion has been observed in these ranges.

The additive combinations of this invention find important utility as antioxidants in a wide variety of oxygen sensitive materials; thus, liquid and solid products derived from petroleum crude are found to possess greatly increased storage stability by the use of an antioxidant of this invention. For example, gasoline jet fuel, kerosene, fuel oil, turbine oils, insulating oils, motor oils and various waxes have increased oxidative stability when they contain an antioxidant of this invention. Likewise, liquid hydrocarbon fuels which contain organometallic additives such as tetraethyllead and other organometallic compositions which are used as fuel additives attain appreciably increased oxidative stability by the practice of this invention. Furthermore, such fuels which contain halogen and phosphorus-containing scavengers for these organometallic compounds are benefited by the practice of this invention. In addition to increased storage stability, lubricating oils and functional fluids, such as automatic transmission and hydraulic fluids, both those derived from naturally occurring hydrocarbons and those synthetically prepared, achieve a high degree of resistance to oxidation during use at elevated temperatures by the practice of this invention. It has been found that lubricating oils may be employed at extremely high temperatures without undergoing oxidative degradation when protected by an antioxidant of this invention. The addition of small quantities of the compositions of this invention to such materials as hydraulic, transformer and other highly refined industrial oils as well as crankcase lubricating oils and lubricating greases prepared from these oils by the addition of metallic soaps, greatly increase their resistance to deterioration in the presence of air, oxygen or ozone. Furthermore, the organic soaps used in the preparation of lubricating greases are themselves stabilized by the practice of this invention.

Organometallic compositions such as tetraethyllead and tetraethyllead antiknock fluids containing halohydrocarbon scavengers, dyes and which may contain various phosphorus compounds and other organometallic additives are stabilized against deterioration during storage by the addition thereto of an antioxidant quantity of the compositions of this invention.

The compositions of this invention are also extremely effective antioxidants for elastomers including high molecular weight unsaturated hydrocarbon polymers both derived from naturally occurring sources and those synthetically prepared. Thus, natural rubbers and synthetic rubbers, including oil extended rubbers and sulfur vulcanized rubbers are greatly benefited by the practice of this invention. Examples of the synthetic rubbers protected by the practice of this invention include such synthetics as polybutadiene, methyl rubber, polybutadiene rubber, butyl rubber, GR-S rubber, GR-N rubber, piperylene rubber and dimethylbutadiene rubber.

The practice of this invention is also useful in protecting paraffin and micro-crystalline petroleum waxes against the oxidative deterioration which leads to rancidity. Furthermore, the compositions of this invention are extremely useful in the stabilization of fats and oils of animal or vegetable origin which become rancid during periods of storage due to oxidative deterioration. Typical animal fats benefited by the practice of this invention include butter fat, lard, beef tallow, fish oils—such as cod liver oil—as well as various foods containing or prepared in animal fats which tend to deteriorate. These include, for example, potato chips, fried fish, donuts, crackers, and various types of pastry such as cakes and cookies. Furthermore, fat fortified animal feeds and fish meals used as animal feeds are greatly benefited by the practice of this invention. Not only are these compositions protected against oxidative deterioration but the inclusion of a composition of this invention in such materials inhibits the degradation of vitamins A, D and E and certain of the B complex vitamins. Examples of compositions containing oils derived from vegetable sources which are benefited by the practice of this invention include castor oil, soy bean oil, rapeseed oil, coconut oil, olive oil, palm oil, corn oil, sesame oil, peanut oil, babassu oil, citrus oils, cotton seed oil and various compositions containing these including peanut butter, peanuts and other whole nuts, salad dressings, margarine and other vegetable shortenings.

The compositions of this invention are also outstanding antioxidants for various organic compounds and polymeric materials including polystyrene, polyvinylchloride, polyvinyl acetate, various epoxide resins and polyester resins and polymers including the alkyds. However, in particular the compositions of this invention are outstanding antioxidants for saturated hydrocarbon synthetic polymers derived from polymerization of an aliphatic monoolefin hydrocarbon compound having preferably up to 5 carbon atoms and only a single unit of unsaturation per monomeric molecule. Examples of such monomers include ethylene, propylene, butylene, isobutylene, 2-methyl-4 butene, 2-methyl-3 butene and the like. Thus the polymers are homopolymers and copolymers of ethylene, propylene, butylene, isobutylene and the pentenes and are usually solid. Polyethylene and polypropylene are preferred polymers in the practice of this invention and they are derived from the polymerization of ethylene and propylene respectively.

An aspect of this invention comprises premixing the phenol sulfide and organic phosphonate prior to addition to the organic material to be protected. Thus, an embodiment of this invention is a composition comprising from about 0.067 to about 1000 parts by weight of a thiobis phenol for each part of phosphorus as an organic phosphonate.

Although any phenol sulfide is applicable to the compositions of this invention, there are several classes of these compounds which have been found to give outstanding results in conjunction with an organic phosphonate. Among these are the thiobis phenol compounds including the 4,4'-thiobis(2,6-dialkyl phenol) compounds and the 2,2'-thiobis(4,6-dialkyl phenol) compounds. However, other classes of hydroxy aryl sulfides including 4,4'-thiobis(3,6-dialkyl phenol) compounds and other sulfur bridged phenols having only a single alkyl substituent on each benzene nucleus, halogenated phenol sulfides, unsubstituted thiobis phenols, and polymeric thiobis phenols are applicable to this invention.

In general the thiobis phenols applicable to this invention can be represented by the formula:

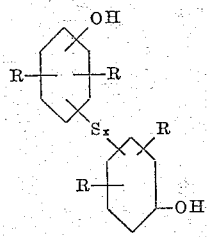

wherein $x$ has a value of from 1–3 and the R's represent hydrogen, alkyl groups, alkoxy groups and halogen.

Among the 4,4'-thiobis phenol compounds applicable to this invention are 4,4'-thiobis(2,6-di-tert-butyl phenol),
4,4'-thiobis(6-tert-butyl-o-cresol),
4,4'-trithiobis(2,6-di-tert-butyl phenol),
4,4'-thiobis(2-tert-butoxy-6-tert-butyl phenol),
4,4'-thiobis(2-methoxy-6-isopropyl phenol),
4,4'-thiobis(2-ethoxy-6-sec-butyl phenol),
4,4'-thiobis(2-butoxy-6-isopropyl phenol),
4,4'thiobis(2-methoxy-6-tert-butyl phenol),
4,4'-thiobis(2-n-butoxy-6-tert-butyl phenol),
4,4'-thiobis(2-methoxy-6-sec-butyl phenol),
4,4'-dithiobis(2-n-propoxy-6-tert-butyl phenol),
4,4'-trithiobis(2-methoxy-6-tert-butyl phenol),
4,4'-dithiobis(2,6-di-tert-butyl phenol),
4,4'-trithiobis(2-methyl-6-isopropyl phenol),
4,4'-dithiobis(2-ethyl-6-sec-butyl phenol),
4,4'-dithiobis(2,6-diisopropyl phenol),
4,4'-dithiobis(2-methyl-6-tert-butyl phenol),
4,4'-trithiobis(2-methyl-6-sec-butyl phenol),
4,4'-dithiobis(2-n-propyl-6-tert-butyl phenol),
4,4'-trithiobis(2-methyl-6-tert-butyl phenol),
4,4'-thiobis(2-ethyl-6-sec-butyl phenol),
4,4'-thiobis(2,6-diisopropyl phenol),
4,4'-thiobis(3-methyl-6-tert-butyl phenol),
4,4'-trithiobis(3-ethyl-6-sec-amyl phenol),
4,4'-dithiobis(3-heptoxy-6-isopropyl phenol), and
4,4'-thiobis(3-methoxy-6-tert-octyl phenol).

Among the 2,2'-thiobis compounds applicable to this invention are:

2,2'-thiobis(4,6-di-tert-butyl phenol),
2,2'-thiobis(6-tert-butyl-o-cresol),
2,2'-trithiobis(4,6-di-tert-butyl phenol),
2,2'-thiobis(4-t-butoxy-6-tert-butyl phenol),
2,2'-thiobis(4-methoxy-6-isopropyl phenol),
2,2'-thiobis(4-ethoxy-6-sec-butyl phenol),
2,2'-thiobis(4-butoxy-6-isopropyl phenol),
2,2'-thiobis(4-methoxy-6-tert-butyl phenol),
2,2'-thiobis(4-n-butoxy-6-tert-butyl phenol),
2,2'-thiobis(4-methoxy-6-sec-butyl phenol),
2,2'-dithiobis(4-n-propoxy-6-tert-butyl phenol),
2,2'-trithiobis(4-methoxy-6-tert-butyl phenol),
2,2'-dithiobis(4,6-di-tert-butyl phenol),
2,2'-trithiobis(4-methyl-6-isopropyl phenol),
2,2'-dithiobis(4-ethyl-6-sec-butyl phenol),
2,2'-dithiobis(4,6-diisopropyl phenol),
2,2'-dithiobis(4-methyl-6-tert-butyl phenol),
2,2'-trithiobis(4-methyl-6-sec-butyl phenol),
2,2'-dithiobis(4-n-propyl-6-tert-butyl phenol),
2,2'-trithiobis(4-methyl-6-tert-butyl phenol),
2,2'-thiobis(4-ethyl-6-sec-butyl phenol),
2,2'-thiobis(4,6-diisopropyl phenol),
2,2'-thiobis(4-methyl-6-tert-butyl phenol),
2,2'-trithiobis(4-ethyl-6-sec-amyl phenol),
2,2'-dithiobis(4-heptoxy-6-isopropyl phenol), and
2,2'-thiobis(4-methoxy-6-tert-octyl phenol).

The phosphonates applicable to the present invention have the formula:

where R and R' are organic groups containing carbon and hydrogen and which may contain halogen, and X, X' and X'' are selected from the group consisting of oxygen and sulfur. Representative of these compounds are: di-n-butyl phosphonate, diisopropyl phosphonate, dioctyl phosphonate, bis(2-ethylhexyl)phosphonate, di-sec-butyl phosphonate, diisobutyl phosphonate, di-tert-butyl phosphonate, bis(1,3-dimethylbutyl)phosphonate, diamyl phosphonate, bis(2-chloro-1-methylethyl)phosphonate, ditolyl phosphonate, diethyl phosphonate, bis(β-chloroisopropyl)phosphonate, O,S-dimethyl thiophosphonate, diphenyl phosphonate, ditolyl thiophosphonate, (tolyl)(isooctenyl) phosphonate, ditolyl phosphonate, dimethyl phosphonate, and methyl tolyl phosphonate. In general, these compounds have from 1 to about 12 carbon atoms in each organic group represented by R and R' in the above formula. These organic groups may be alkyl, aryl, aralkyl, or alkaryl and may comprise only carbon and hydrogen or may contain in addition, halogen.

The dialkyl hydrogen phosphonates are preferred since compositions getting outstanding antioxidant effectiveness result from their employment. Another preferred class of phosphonates within the scope of this invention are those compounds represented by the above formula in which X, X' and X'' are oxygen. These are preferred since although they are not remarkably effective antioxidants in their own right, they have shown outstanding synergistic effectiveness when employed with phenol sulfides.

A preferred embodiment of this invention involves providing a lubricating oil normally susceptible to oxidative deterioration containing, in amount sufficient to inhibit such deterioration, a small quantity of the above combination of additives. It has been found in actual practice that small amounts of these mixtures very effectively stabilize lubricant compositions—e.g., petroleum hydrocarbon oils and synthetic oils—against oxidative deterioration.

To prepare the preferred lubricants of this invention, appropriate quantities of phenol sulfide and phosphonate are blended with the base oil to be protected. Suitable base oils include mineral oils and also synthetic diester oils, such as sebacates, adipates, etc. which find particular use as aircraft instrument oils, hydraulic and damping fluids, and precision bearing lubricants. All of these base oils are normally susceptible to oxidative deterioration, especially at elevated temperatures.

The finished lubricants of this invention have much greater oxidation stability and many other improved performance characteristics as compared with the corresponding base oils. In the case of lubricating oils of this invention, spectacular improvements are afforded, including markedly reduced engine wear characteristics, greatly improved oxidation stability and greatly reduced bearing corrosion properties.

EXAMPLES 1–30

To illustrate the outstanding benefits obtained by the practice of this invention, a standard oil oxidation test is used. The equipment and test procedure described by Kroger et al., Erdol and Kohle, 2, page 398 (1949) served as a basis for the tests. The equipment and procedures are slightly modified in order to make the oxidizing conditions more strenuous. In this manner the test lubricants are subjected to severe oxidizing conditions in order to conclusively establish the effectiveness of additives under very adverse conditions. Furthermore, the modifications are found to provide results which correlated extremely well with test results of other standard procedures, including actual engine tests.

The equipment consists of a reaction cell connected with an open end manometer whereby the total uptake of oxygen by the oil is determined by noting the drop in height of the mercury in the manometer. The test oil sample is placed in the reaction cell which is then flushed with oxygen and the temperature is then raised and held at that selected for the test until the substrate oil undergoes catastrophic oxidation which is shown by a rapid oxygen uptake. In all cases, the test oil is deliberately contaminated with iron hexoate as an oxidation promoter. In tests of this nature, the oxidation stability of a test lubricant is ordinarily determined by measuring its induction period, that is, the time required for catastrophic deterioration under the above outlined conditions. The longer the induction period, the more stable the lubricant. Although this test is satisfactory for measuring the antioxidant effectiveness of ordinary additives, it was modified in many of the tests reported below. The antioxidant compositions of this invention are sometimes so effective that catastrophic oxidation of the oil does not occur, and there is no point in time at which an antioxidant completely loses effectiveness, at which point a rapid increase in the oxygen uptake occurs. Thus, the antioxidant compositions of this invention often, after a period of time, slowly absorb oxygen without catastrophic oxidation. Thus, in order to measure the effectiveness of the compositions of this invention, the point at which 40 percent of the differential oxygen pressure above atmospheric in the apparatus is consumed, is taken as the induction period.

In the following tables, Table I shows the lack of effectiveness of the phosphonates when used by themselves as antioxidants. Thus, in the oil tested, the induction period was three minutes when the oil contained no additive. The use of dimethyl phosphonate in concentrations of $1 \times 10^{-2}$ moles per liter and $2 \times 10^{-2}$ moles per liter had absolutely no effect on this induction period. Other phosphonates tested contributed only minor antioxidant effectiveness to the oil. In fact, none of the phosphonates tested contributed sufficiently to the antioxidant activity to be of any value at all in protecting the lubricating oil against oxidation.

Table I

ANTIOXIDANT EFFECTIVENESS OF PHOSPHATES ALONE

| Example No. | Additive | Concentration of phosphorus in moles/ $1. \times 10^{-2}$ | Wgt. percent phosphorus | Induction time (minutes) |
|---|---|---|---|---|
| 1 | None | 0 | 0 | 3 |
| 2 | Dimethyl phosphonate | 1.0 | 0.037 | 3 |
| 3 | ----do---- | 2.0 | 0.073 | 3 |
| 4 | Di-sec-butyl phosphonate | 1.0 | 0.037 | 5 |
| 5 | Diisopropyl phosphonate | 1.0 | 0.037 | 12 |
| 6 | Di-tert-butyl phosphonate | 1.0 | 0.037 | 8 |
| 7 | Bis(2,6-dimethylheptyl) phosphonate. | 1.0 | 0.037 | 10 |
| 8 | Bis(1,3-dimethylbutyl) phosphonate. | 1.0 | 0.037 | 11 |

Table II illustrates the use of the various phosphonates shown in Table I in conjunction with 4,4'-thiobis(2-methyl-6-tert-butyl phenol). As seen by Table II, when tested at $0.5 \times 10^{-2}$ mole per liter, 4,4'-thiobis(2-methyl-6-tert-butyl phenol) gives an induction time of 66 minutes, or an improvement of 63 minutes over the base oil alone. When tested at $1.0 \times 10^{-2}$ moles per liter, 4,4'-thiobis(2-methyl-6-tert-butyl phenol) gives an induction period of 120 minutes or an improvement of 117 minutes over the base oil with no added antioxidant. These results are shown in Examples 9 and 10 of Table II. Also shown by Table II are tests of 4,4'-thiobis(2-methyl-6-tert-butyl phenol) with the various phosphonates shown in Table I. The data from Table I are repeated for ready comparison of the data. Table II shows that in each instance a substantial increase in induction time over that expected by adding the individual increase in induction time of the 4,4'-thiobis(2-methyl-6-tert-butyl phenol) and phosphonate is achieved. For example, as shown by Example 2 in Table II, an effectiveness of approximately 300 percent of the expected effectiveness was obtained from a mixture of di-tert-butyl phosphonate and 4,4'-thiobis(2-methyl-6-tert-butyl phenol). Outstanding and unexpected increases of effectiveness were also obtained when 4,4'-thiobis(2-methyl-6-tert-butyl phenol) was tested with diisopropyl phosphonate, di-sec-butyl phosphonate, bis(2,6-dimethyl heptyl)phosphonate.

Table II

EFFECTIVENESS OF VARIOUS PHOSPHONATES WITH 4,4'-THIOBIS(2-METHYL-6-TERT-BUTYL PHENOL)

| Ex. No. | Additive | Concentration of phenol sulfide moles/l.×10$^{-2}$ | Wgt. percent phenol sulfide | Concentration of phosphorus in moles/l.×10$^{-2}$ | Wgt. percent phosphorus | Induction time (minutes) | Calculated induction time | Increase over calculated value |
|---|---|---|---|---|---|---|---|---|
| 1 | None | | | | | 3 | | |
| 9 | 4,4'-thiobis(2-methyl-6-tert-butyl phenol) | 0.5 | 0.210 | 0 | | 66 | | |
| 10 | do | 1.0 | 0.421 | 0 | | 120 | | |
| 6 | Di-tert-butyl phosphonate | 0 | | 1.0 | 0.037 | 8 | | |
| 11 | Di-tert-butyl phosphonate and 4,4'-thiobis(2-methyl-6-tert-butyl phenol) | 0.512 | 0.216 | 0.526 | 0.019 | 208 | 69 | 139 |
| 5 | Diisopropyl phosphonate | 0 | | 1.0 | 0.037 | 12 | | |
| 12 | Diisopropyl phosphonate and 4,4'-thiobis(2-methyl-6-tert-butyl phenol) | 0.512 | 0.216 | 0.572 | 0.021 | 170 | 72 | 98 |
| 4 | Di-sec-butyl phosphonate | 0 | | 1.0 | 0.037 | 5 | | |
| 13 | Di-sec-butyl phosphonate and 4,4'-thiobis(2-methyl-6-tert-butyl phenol) | 0.512 | 0.216 | 0.582 | 0.021 | 143 | 67 | 86 |
| 8 | Bis(1,3-dimethylbutyl) phosphonate | 0 | | 1.0 | 0.037 | 11 | | |
| 14 | Bis(1,3-dimethylbutyl) phosphonate and 4,4'-thiobis(2-methyl-6-tert-butyl phenol) | 0.512 | 0.216 | 0.528 | 0.019 | 134 | 70 | 63 |
| 7 | Bis(2,6-dimethylheptyl) phosphonate | 0 | | 1.0 | 0.037 | 10 | | |
| 15 | Bis(2,6-dimethylheptyl) phosphonate and 4,4'-thiobis(2-methyl-6-tert-butyl phenol) | 0.512 | 0.216 | 0.578 | 0.021 | 100 | 70 | 29 |

Still further tests were conducted using dimethyl phosphonate and various phenol sulfides to show the outstanding synergistic effectiveness of the compositions of this shown in Examples 24 and 25, a thiobis(alkyl phenol) prepared from a mixed alkyl phenol by reaction with a sulfur halide.

Table III

EFFECTIVENESS OF VARIOUS PHENOL SULFIDES WITH DIMETHYL PHOSPHONATE

| Ex. No. | Additive | Concentration of phenol sulfide, moles/l.×10$^{-2}$ | Wt. percent phenol sulfide | Concentration of phosphorus in moles/l.×10$^{-2}$ | Wt. percent phosphorus | Induction time (minutes) |
|---|---|---|---|---|---|---|
| 1 | Dimethyl phosphonate | 0 | 0 | 1.0 | | 3 |
| 16 | 2,2'-thiobis(4-methyl-6-tert-butyl phenol) | 1.0 | 0.421 | 0 | 0 | 564 |
| 17 | 2,2'-thiobis(4-methyl-6-tert-butyl phenol) plus dimethyl phosphonate | 0.5 | 0.210 | 0.7 | 0.026 | 3,720 |
| 18 | 4,4'-thiobis(6-tert-butyl-m-cresol) | 1.0 | 0.421 | 0 | 0 | 81 |
| 19 | Dimethyl phosphonate plus 4,4'-thiobis(6-tert-butyl-m-cresol) | 1.0 | 0.421 | 1.2 | 0.044 | Above 930 |
| 20 | do | 0.5 | 0.210 | 0.7 | 0.026 | 151 |
| 21 | 4,4'-thiobis(2,6-di-tert-butyl phenol) | 1.0 | 0.520 | 0 | 0 | 36 |
| 22 | Dimethyl phosphonate plus 4,4'-thiobis(2,6-di-tert-butyl phenol) | 0.5 | 0.260 | 0.6 | 0.022 | 71 |
| 23 | 4,4'-thiobis(2,6-di-tert-butyl phenol) plus dimethyl phosphonate | 1.1 | 0.572 | 1.1 | 0.040 | Above 930 |
| 24 | Thiobis(alkylphenol) | 1.0 | 1.09 | 0 | 0 | 35 |
| 25 | Thiobis(alkylphenol) plus dimethyl phosphonate | 1.0 | 1.09 | 1.0 | 0.037 | 96 | invention. These are illustrated in Examples 16–25 in Table III. The data in Table III indicate that by virtue of this invention, a tremendous increase in the oxidative stability of the oil can be achieved at a very low concentration of additive. For example, using dimethyl phosphonate and 2,2'-thiobis(4-methyl-6-tert-butyl phenol) as shown in Examples 16 and 17, the resulting oil is 650 percent as effective as the oil employing twice the concentration of the phenol sulfide. This is in spite of the fact that the dimethyl phosphonate alone contributes nothing to the antioxidant stability of the oil. Thus, the compositions of this invention give truly unexpected and synergistic results in stabilizing organic compositions. Similar, and in some cases even more spectacular results are illustrated by the data in Table III for combinations of dimethyl phosphonate and 4,4'-thiobis(6-tert-butyl-m-cresol), 4,4'-thiobis(2,6-di-tert-butyl phenol), and as Still additional tests were conducted on dimethyl phosphonate and 4,4'-thiobis(2-methyl-6-tert-butyl phenol) to determine the optimum concentration of each additive. These tests are shown in Table IV below as Examples 26–30. For convenience, the data from Examples 1, 2, 3, 9 and 10 have been repeated for comparative purposes. The data in Table IV show that by employing a somewhat larger molar proportion of phosphorus as a phosphonate, compared to the amount of phenol sulfide, truly fantastic increases in the induction time may be achieved by the practice of this invention. Thus, in Examples 28 and 29 wherein somewhat more phosphorus than phenol sulfide is employed, the induction time actually increased in multiples of two orders of magnitude giving increases in the induction period of 28,300 percent and 29,150 percent respectively.

*Table IV*

ANTIOXIDANT EFFECT OF DIMETHYL PHOSPHONATE WITH 4,4'-THIOBIS (2-METHYL-6-TERT-BUTYL PHENOL)

| Ex. No. | Additive | Concentration of phenol sulfide, moles/l.×10⁻² | Wt. percent phenol sulfide | Concentration of phosphorus in moles/l.×10⁻² | Wt. percent phosphorus | Induction time (minutes) | Calculated induction time | Increase over calculated value |
|---|---|---|---|---|---|---|---|---|
| 1 | None | 0 | 0 | 0 | 0 | 3 | | |
| 2 | 4,4'-thiobis(2-methyl-6-tert-butyl phenol) | 0.5 | 0.210 | 0 | 0 | 66 | | |
| 3 | ----do---- | 1.0 | 0.421 | 0 | 0 | 120 | | |
| 9 | Dimethyl phosphonate | 0 | 0 | 1.0 | 0.037 | 3 | | |
| 10 | ----do---- | 0 | 0 | 2.0 | 0.074 | 3 | | |
| 26 | Dimethyl phosphonate and 4,4'-thiobis(2-methyl-6-tert-butyl phenol) | 0.5 | 0.210 | 0.17 | 0.0063 | 110 | 69 | 41 |
| 27 | ----do---- | 0.5 | 0.210 | 0.591 | 0.022 | 224 | 69 | 155 |
| 28 | ----do---- | 0.5 | 0.210 | 0.95 | 0.035 | 19,638 | 69 | 19,569 |
| 29 | ----do---- | 0.5 | 0.210 | 2.9 | 0.107 | 20,173 | 69 | 20,104 |
| 30 | ----do---- | 1.0 | 0.421 | 1.3 | 0.048 | 66,36 | 123 | 6,513 |

EXAMPLES 31–34

To further illustrate the useful properties of the novel mixtures of this invention, recourse is had to the Polyveriform Oxidation Stability Test as described in the paper entitled "Factors Causing Lubricating Oil Deterioration in Engines" (Ind. and Eng. Chem., Anal. Ed., 17, 302 (1945)). See also "A Bearing Corrosion Test for Lubricating Oils and Its Correlation With Engine Performance" (Anal Chem., 21, 737 (1949)). This test effectively evaluates the performance of lubricating oil antioxidants. The test equipment procedure employed and correlations of the results with engine performance are discussed in the first paper above cited. By employing various compounds of this invention in oxygen-sensitive lubricating oil, effective inhibition of oxidation deterioration is achieved.

To demonstrate the outstanding performance of the compositions of this invention as antioxidants for industrial lubricants, comparative tests were conducted using the method and apparatus essentially as described in the publication first above-mentioned. One minor modification was that the steel sleeve and copper test piece described in this publication were omitted from the apparatus. In these tests an initially additive-free, 95 V. I. solvent-refined SAE-10 crankcase oil was used. The principal test conditions consisted of passing 70 liters of air per hour through the test oil for a total period of 20 hours while maintaining the oil at a temperature of 300° F. to make the test more representative of actual use conditions. Oxidation deterioration of the oil was further promoted by employing as oxidation catalysts 0.05 percent by weight of ferric oxide (as ferric 2-ethyl hexoate) and 0.10 percent by weight of lead bromide, both of these amounts being based upon the weight of oil employed. Lubricating oils of this invention were prepared by blending a phosphonate and phenol sulfide with a portion of the above lubricating oil. These compositions were then subjected to the above stringent oxidation test. Another portion of the same lubricating oil was tested with no added antioxidant, while still other portions were tested with the phenol sulfide and phosphonate in the absence of the other. The results of these tests are shown in Table V.

*Table V*

EFFECTIVENESS OF DIMETHYL PHOSPHONATE AND 4,4'-THIOBIS(2,6-TERT-BUTYL PHENOL) IN THE POLYVERIFORM TEST

| Test No. | Additive | Weight percent phenol sulfide | Weight percent phosphorus as dimethyl phosphonate | Used oil properties | | |
|---|---|---|---|---|---|---|
| | | | | Acid No. | Percent viscosity increase at 100° F., SUS * | Visual rating |
| 31 | None | 0 | 0 | 5.7 | 107 | C. |
| 32 | Dimethyl phosphonate | 0 | 0.05 | 4.4 | 60 | C. |
| 33 | 4,4'-thiobis(2-methyl-6-tert-butyl phenol) | 0.5 | 0 | 4.6 | 112 | E. |
| 34 | 4,4'-thiobis(2-methyl-6-tert-butyl phenol) and dimethyl phosphonate | 0.5 | 0.05 | 1.2 | 17 | A. |

* Saybolt Universal seconds.

By referring to the data presented in Table V, it is immediately apparent that the mixture of 4,4'-thiobis(2-methyl-6-tert-butylphenol) and dimethyl phosphonate exhibits a striking and unexpected potency in suppressing oxidative deterioration of lubricating oil. Furthermore, comparison of the results obtained in Examples 32 and 33 with those of Example 34 show that the composition of this invention gives an oil which is more stable than could be expected from the antioxidant activity of either the phenol sulfide or phosphonate alone.

EXAMPLES 35–39

To show the outstanding benefits of the compositions of this invention under actual engine conditions a test known as the CLR L–38–559 test was employed. This test is conducted in the CLR oil test engine and accessory equipment described in a publication called Development of Research Technique for a Study of the Oxidation Characteristics of Cranckcase Oils in the CLR Oil Test Engine (Programs 3–9), published May 1959 by the Coordinating Research Council, Inc., New York, New York. The technique involves the continuous operation of the single cylinder CLR oil test engine under constant speed, air-fuel ratio, and fuel flow conditions for a recommended total of 40 hours subsequent to a break-in period of 4½ hours. (In some of the tests reported below the time was extended.) Prior to each test run, the engine is thoroughly cleaned and pertinent measurements of engine parts (such as copper lead connecting rod bearings) are taken, and a complete set of new piston rings and new copper lead connecting rod test bearing inserts are installed. Performance of the test oil is judged by a visual examination of the engine for deposits, by the weight loss of the copper lead test bearing and by comparision of the inspection data on samples of used oil.

In conducting the tests shown below the standard procedure as recommended by the Coordinating Research Council in the above publication was followed. Thus, the test was conducted for 40 hours (or more) at an engine speed of 3150±25 r.p.m. with a fuel flow of 4.75±25 lb. per hour, an air-fuel ratio of 14.0±0.5, jacket-outlet coolant temperature of 200°±2° F. and a 10°±1° F. difference between jacket-inlet and jacket-outlet coolant temperature. The spark advance was adjusted to 35°±1° before top dead center. Oil pressure and crankcase vacuum were 40±2 p.s.i. and 2±0.5" of water respectively while exhaust back pressure was maintained at a maximum of 1" of mercury.

As shown by the following table (Table VI), oil containing the additive combination of this invention gives outstanding results. In certain cases the tests were continued in excess of the 40 hours recommended by the Coordinating Research Council to show the infinite superiority of the additives of this invention. Thus, in the base line test which contained no additives, after 40 hours of operation, 1545 mg. were lost from the test bearing and the acid number increased 1.9 while the viscosity of the oil increased 8.2 percent. In a similar test when 0.5 weight percent of 4,4'-thiobis(2-methyl-6-tert-butyl phenol) was employed, the oil had increased in viscosity 13.8 percent after 60 hours. An acid number increase of 1.6 and a bearing weight loss of 1924 mg. were produced in this lengthened test. Similarly, a high bearing weight loss resulted from the use of 0.025 percent phosphorus as di-sec-butyl phosphonate. However, when 0.29 percent of 4,4'-thiobis(2-methyl-6-tert-butyl phenol) and 0.025 percent phosphorus as di-sec-butyl phosphonate were employed and the test continued for 80 instead of the normal 40 hours the bearing weight loss was reduced to the unusually low figure of 53.2 mg. while the viscosity increase was only 13.5 percent and the acid number increased only 1.6. Since the critical portion of this test is the amount of bearing weight loss encountered, it can be seen that the composition of this invention reduced the bearing weight loss by an unprecedented 97 percent. Neither the di-sec-butyl phosphonate nor the 4,4'-thiobis-(2-methyl-6-tert-butyl phenol) show any appreciable reduction of the bearing weight loss by themselves. In fact, the table clearly shows that the phosphonate alone in a similar concentration actually increases the bearing weight loss. Thus the compositions of this invention give truly outstanding and unexpected results in preventing catastrophic engine wear.

of the illustrative oils used in Examples 40-45 are as shown in Table VII:

*Table VII*

PROPERTIES OF REPRESENTATIVE PETROLEUM HYDROCARBON OILS

| Oil | A | B | C | D | E | F |
|---|---|---|---|---|---|---|
| Gravity at 60° API | 30.3 | 30.5 | 28.8 | 31.1 | 20.5 | 31.0 |
| Viscosity, Saybolt: | | | | | | |
| Seconds at 100° F | 178.8 | 373.8 | 309.8 | 169.0 | 249.4 | 335.4 |
| Seconds at 210° F | 52.0 | 58.4 | 63.8 | 51.5 | 45.7 | 68.4 |
| Viscosity Index | 154.2 | 107.4 | 141.9 | 157.8 | 35.8 | 144.4 |
| Pour Point | −30 | +10 | −20 | −15 | | 0 |
| Flash point | 410 | 465 | | | 365 | 385 |
| Sulfur, percent | 0.2 | 0.3 | 0.3 | 0.3 | 0.3 | 0.1 |

EXAMPLE 40

To 100,000 parts of Oil A are added with stirring 120 parts (0.12 percent) of 2,2'-thiobis(6-tert-butyl-p-cresol) and sufficient dimethyl phosphonate to give 0.025 weight percent phosphorus. The resulting oil is found to possess greatly improved resistance to oxidative deterioration.

EXAMPLE 41

To 100,000 parts of Oil B are added 1000 parts (1 percent) of 4,4'-thiobis(2,6-di-tert-butyl phenol) and 0.5 weight percent of phosphorus or di(β-chloropropyl) phosphonate. On agitating this mixture, a homogeneous solution results and the resulting oil composition possesses enhanced oxidation resistance.

EXAMPLE 42

With 100,000 parts of Oil C are blended 500 parts (0.5 percent) of 4,4'-trithiobis(2,6-di-tert-butyl phenol) and 0.025 parts of phosphorus as didodecyl phosphonate. The resulting oil possesses enhanced resistance against oxidative deterioration.

EXAMPLE 43

To 100,000 parts of Oil D are added 1000 parts (1.0 percent) of 4,4'-thiobis(6-tert-butyl-m-cresol) and 0.5 weight percent phosphorus as diisobutyl phosphonate. The resulting oil is found to possess enhanced resistance against oxidative deterioration.

EXAMPLE 44

With 100,000 parts of Oil E are blended 5000 parts (5 percent) of 4,4'-dithiobis(6-tert-butyl-o-cresol) and 1.5 weight percent phosphorus as diamyl phosphonate. After mixing the resulting oil possesses enhanced resistance to oxidation.

EXAMPLE 45

To 100,000 parts of Oil F are added 250 parts (0.25 percent) of 4,4'-thiobis(6-tert-butyl-o-cresol) and sufficient dimethyl-phosphonate to give 0.2 percent phosphorus. The resulting oil possesses greatly enhanced resistance against oxidative deterioration.

*Table VI*

CLR ENGINE OIL OXIDATION TEST RESULTS

| Run No. | Additive | Weight percent phenol sulfide | Weight percent phosphorus | Test time, hours | Viscosity increase, percent at 100° F. | Acid number | Bearing weight loss, mg. |
|---|---|---|---|---|---|---|---|
| 35 | None | | | 40 | 8.2 | 1.9 | 1,545 |
| 36 | 4,4'-thiobis(2-methyl-6-tert-butyl phenol) | 0.5 | | 60 | 13.8 | 1.6 | 1,924 |
| 37 | Di-sec-butyl phosphonate | | 0.025 | 40 | | | 1,931 |
| 38 | ____do____ | | 0.025 | 60 | | | 2,186 |
| 39 | 4,4'-thiobis(2-methyl-6-tert-butyl phenol) and di-sec-butyl phosphonate | 0.29 | 0.025 | 80 | 13.5 | 1.6 | 53.2 |

The following examples illustrate various specific embodiments of this invention. The physical characteristics The additive combinations of this invention effectively stabilize such lubricating and industrial oils as crankcase lubricating oils, transformer oils, turbine oils, transmission fluids, cutting oils, gear oils, industrial oils, mineral white oils, glass annealing oils, and, in general, engine and industrial oils which are derived from crude petroleum and are normally susceptible to deterioration in the presence of air, particularly at elevated temperatures and most particularly in the presence of iron oxide.

In the lubricating oil compositions of this invention effective use can be made of other additives which are known to the art, such as detergent-dispersants, pour point depressants, viscosity index improvers, anti-foam agents, rust inhibitors, oiliness or film strength agents, dyes, and the like. Typical of the detergent additives that can be used in the compositions of this invention are metallic soaps of high molecular weight acids, such as aluminum naphthenates, calcium phenyl stearates, calcium alkyl salicylates, alkaline earth metal petroleum sulfonates, alkaline earth metal alkyl phenol sulfides (barium amyl phenol sulfide, calcium octyl phenol disulfide, etc.), metal salts of wax-substituted phenol derivatives, and the like. Of the viscosity index improvers and pour point depressants, effective use can be made of polymers of the esters of methacrylic acids and higher fatty alcohols and the corresponding polymers of esters of acrylic acid and higher fatty alcohols. These and other additives which can be employed in the compositions of this invention will now be well known to those skilled in the art.

The antioxidant mixtures of this invention are also useful as additives to functional fluids and automatic transmission fluids. The primary constituent of a functional fluid is a refined mineral lubricating oil having carefully selected minimum viscosity of 49 Saybolt Universal seconds (SUS) at 210° F. and a maximum viscosity of 7,000 SUS at 0° F., generally a distillate oil, lighter than an SAE 10 motor oil. The oil usually amounts to between about 73.5 to about 97.5 percent by weight of the finished fluid. Preferably, the base oil is selected from a paraffin base distillate such as a Pennsylvania crude.

The fluids usually contain compounds which are characterized by containing one or more organic components which may be alkyl, aryl, alkaryl or aralkyl groups that are bonded to one or more metal atoms through coupling groups such as sulfonate, hydroxyl, carboxyl and mercaptan. The metal atoms may be aluminum, calcium, lithium, barium, strontium and magnesium. The organic components contain oil solubilizing groups such as high molecular weight straight or branched chain paraffins, aromatic or naphthenic rings, or contain a halogen. These metal compounds are present in the compounded fluid in a concentration range of between about 0.1 to about 5 percent by weight. These compounds include alkaline-earth metal salts of phenyl-substituted long chain fatty acids, alkaline-earth metal salts of the capryl or octyl esters of salicylic acid, the alkaline-earth metal salts of petroleum sulfonic acids, the alkaline-earth metal salts of alkyl-substituted phenol sulfides, the salts of aluminum or the alkaline-earth metals with cetyl phenol, and the metal salts of wax-substituted phenol derivatives. Another class of additives are the so-called overbased phenates and sulfonates, which can be prepared by reaction between an alkyl phenol or alkyl phenol sulfide and an alkaline-earth metal oxide or hydroxide at an elevated temperature. The overbased phenate formed from the reaction contains up to two or three times as much metal as the normal phenate.

In addition, functional fluids may contain additional components which improve the properties of the fluid. Typical components and their concentration range in the fluid are as follows:

From about 1 to about 5 percent of an anti-squawk additive, usually a sulfurized oil, such as sulfurized sperm oil, sulfurized lard, sulfurized vegetable oil, sulfurized glyceride, or a sulfurized ester of fatty acids.

From about 0.05 to about 2 percent of a pour point depressant. Typical types of additives are wax-substituted naphthalenes, esters of wax-substituted phenol, polymerized unsaturated esters and acrylic polymers such as polymerized esters of methacrylic acid.

About 0.005 to about 0.1 percent of a foam inhibitor. Foam inhibitors include fatty acids and fatty acid esters, pine oil, alkyl lactates, higher ethers such as 2-(di-tert-amyl phenoxy) ethanol and mixtures of materials such as glycerol and sodium bis(2-ethylhexyl)sulfosuccinate.

From about 0.03 to about 0.1 percent of a rust preventive such as carboxylic acid derivatives including alkylated succinic acid, esters and partial esters of di- and polycarboxylic acids, esters and partial esters of hydroxy-substituted di- and polycarboxylic acids and alkyl-substituted acids containing at least two carboxylic acid groups joined by nitrogen, oxygen or sulfur esters of acids derived from oxidized petroleum; amine derivatives including hydroxy amines, hydroxy amidines, amine salts of partial esters of phosphorus acids, hydroxy amine salts of oxidized petroleum acids, hydroxy amine salts of fatty acids and long chain alkyl amines; organic sulfonates; long chain alkyl ketones; organic phosphates and phosphites; morpholine derivatives and phosphatides including lecithin and fatty acids.

About 0.1 to about 2 percent of an extreme pressure agent. These include organic compounds containing chlorine, phosphorus and sulfur, such as chlorinated waxes or a $P_2S_5$-terpene reaction product; organic phosphates and phosphites such as for example, tricresylphosphate or a zinc di-alkyl dithiophosphate and lead soaps as lead naphthenate.

From about 0.05 to about 0.2 percent of a metal deactivator. Such compounds include complex organic nitrogen and sulfur-containing compounds, as for example, amines and sulfides. Also included are such compounds as organic dihydroxyphosphines, trialkyl and triaryl phosphites, certain diamines and soaps containing a metal such as tin, nickel, chromium, thallium or titanium.

From about 1 to about 10 percent of a viscosity index improver such as a polymerized olefin or isoolefin, butylene polymer or alkylated styrene polymer.

The following examples show typical functional fluids of this invention. The fluids are formed by mixing the ingredients together, while heating the oil to a temperature up to 200° F.

EXAMPLE 46

A fluid of this invention is prepared by blending 80 parts of a conventionally-refined Pennsylvania mineral oil (99 SUS at 100° F.), 2 parts of 4,4'-thiobis(6-tert-butyl-o-cresol), sufficient diphenyl phosphonate to give 1.0 percent phosphorus in the finished composition, 5 parts of barium petroleum sulfonate, 10 parts of a polyacrylate having a molecular weight of approximately 7,000 derived from a fatty alcohol such as cetyl or lauryl alcohol, 0.1 part of a dimethylsilicone polymer anti-foam agent, 2 parts of dialkyl zinc dithiophosphate and 0.9 part of a dark, viscous liquid having a viscosity of 560 SUS at 210° F., a flash point of 420° F., a pour point of 30° F. and a specific gravity of 60/60° F. of 0.919.

EXAMPLE 47

Another such fluid consists of 95 parts of a solvent-refined, light acid-treated, clay-contacted, solvent dewaxed paraffin base distillate mineral oil (110 SUS at 100° F.); 0.1 part of 4,4'-dithiobis(2,6-diisopropyl phenol); 0.01 percent phosphorus as dihexyl phosphonate; 0.1 part of calcium octyl phenol sulfide; 2 parts of a sulfurized sperm oil having a sulfur content between 10–12 percent, a viscosity of 210° F. of 200 SUS and a pour point of 65° F.; 0.3 part of an ester of an aromatic acid and wax-alkylated phenol having a molecular weight of approximately 450; 2.5 parts of a linear pale color isobutylene polymer of a controlled molecular weight having a viscosity of 3,000 SUS at 210° F., a specific gravity 60/60° F. of 0.875.

EXAMPLE 48

An automatic transmission fluid is made by mixing 97 percent of an oil blend comprising 59.0 parts of a solvent-extracted, Coastal oil, 40 SUS at 210° F.; 2.0 parts of 4,4'-trithiobis(2,6-di-tert-butyl phenol); 0.75 weight percent phosphorus as diheptyl phosphonate; 1.0 part of a barium phenol sulfide containing 2.4 percent barium, 2 percent calcium and 3.5 percent sulfur, having a viscosity of 126 SUS at 210° F., a flash point of 430° F., a pour point of 10° F. and a specific gravity 60/60° F. of 0.97; 1.0 part of sulfurized sperm oil.

EXAMPLE 49

96 parts of a conventionally-refined Pennsylvania mineral oil (99 SUS at 100° F.); 0.5 weight percent phosphorus as dimethylphosphonate; 1.5 parts of 4,4'-trithiobis[2,6-di-($\alpha,\alpha$-dimethylbenzyl)phenol]; 2 parts of a mixed barium phenol sulfide-calcium sulfonate containing 5.7 percent barium, 0.68 percent calcium and 2.9 percent sulfur, having a viscosity of 92 SUS at 210° F., a flash point of 410° F., a pour point of 10° F. and a specific gravity of 60/60° F. of 0.988 are blended into an effective fluid of this invention.

EXAMPLES 50–52

A standard, modern automatic transmission was used to evaluate the tremendous effectiveness of the additives of this invention as antioxidants for oils used in automatic transmission fluid service. The test schedule consisted of continuous operation of the transmission at 1800 r.p.m. input shaft speed, sump temperature, and an eight-second shifting cycle between third and fourth gear. An Eagle multipulse timer, utilizing a synchronous motor-driven cam that activated a microswitch, provided an accurate eight-second cycle signal to the transmission shifter arm air cylinder solenoid valve. Oil sump temperature was controlled at 300±2° F. by means of a water-cooled heat exchanger. Each test was carried out for 120 hours. On completion of each test, the transmissions were dismantled and the various operating parts were visually inspected for sludge and varnish formation. The stability of the transmission oil was also determined by means of used oil analyses.

The base oil in these tests was a commercially available automatic transmission fluid, the oil having a viscosity at 100° F. of 206 SUS and 51.6 SUS at 210° F. The tests were run on the above automatic transmission fluid and on other portions thereof which had been treated with (1) 4,4'-thiobis(6-tert-butyl-o-cresol) at a concentration of 1.0 percent by weight and (2) 0.25 percent 4,4'-thiobis-(6-tert-butyl-o-cresol) and 0.03 percent phosphorus as di-sec-butyl phosphonate. The results of these tests are shown in Table VIII.

As seen by the data in Table VIII, the automatic transmission fluid containing the additive combination of this invention was much more resistant to oxidative deterioration than the base oil and was also superior to the oil containing only the phenol sulfide. For example, the base oil possessed a very significant increase in viscosity on completion of the test, this being a direct indication that a substantial amount of polymerization had occurred in the oil. On the other hand, the transmission fluid containing both the phosphonate and phenol sulfide showed reductions in viscosity indicating that the oil had not undergone destructive polymerization reactions during the tests. The eminent superiority of the transmission fluid of this invention was also shown by the substantial reduction in pentane insoluble matter and in acid number in the used oils as compared with the base oil and the oil with the phenol sulfide above. Particularly noteworthy was the fact that the transmission parts when operated on the base transmission fluid were very heavily sludged and were coated with a moderate amount of varnish. However, the transmission parts, after operation on the automatic transmission fluids of this invention were comparatively free from sludge and varnish.

The synthetic lubricants which are enhanced by the practice of this invention are, in general, non-hydrocarbon organic compositions; i.e., organic compositions which contain elements other than carbon and hydrogen. Examples of general classes of material which are protected against oxidative deterioration by the practice of this invention include diester lubricants, silicones, halogen containing organic compounds including the fluorocarbons; polyalkylene glycol lubricants, and organic phosphates which are suitable as hydraulic fluids and lubricants. The synthetic diester oils stabilized by the practice of this invention include sebacates, adipates, etc., which find particular use as aircraft instrument oils, hydraulic and damping fluids, and precision bearing lubricants. These diester oils are exceedingly difficult to stabilize under high temperature conditions. In this invention, use can be made of a wide variety of diester oils of the type described in Industrial and Engineering Chemistry, 39, 484–91 (1947). Thus, use can be made of the diesters formed by the esterification of straight chain dibasic acids containing from 4 to about 16 carbon atoms with saturated aliphatic monohydric alcohols containing from 1 to about 10 carbon atoms. Of these diester oils, it is preferable that the alcohol used in their preparation be a branched chain alcohol because the resultant diesters have very valuable lubricating properties and the inhibitor of this invention very effectively stabilizes these materials against oxidative deterioration. Thus, use can be made of oxalates, malonates, succinates, glutarates, adipates, pimelates, suberates, azelates, sebacates, etc.

The diester lubricants used in the lubricant compositions of this invention have the formula:

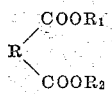

where R is an aliphatic hydrocarbon radical which may be saturated or unsaturated and has from 2 to 14 carbon atoms and $R_1$ and $R_2$ are straight or branched chain alkyl groups. The diesters utilized in the preferred lubricant compositions include esters of succinic, glutaric, adipic, pimelic, suberic, azelaic and sebacic acid. Typical examples of such esters are diisooctyl azelate, di(2-ethylhexyl) sebacate, di-sec-amyl sebacate, diisooctyl adipate,

*Table VIII*

ANTIOXIDANT EFFECTIVENESS OF PHENOL SULFIDE-PHOSPHONATE MIXTURES IN AUTOMATIC TRANSMISSION FLUIDS

| Example number | Additive | Weight percent phosphorus | Weight percent phenol sulfide | Percent change in oil viscosity during test when measured at 100° F. | Acid No. of used oil, mg. KOH/g. of oil | Pentane insoluble sludge in oil after test, percent by weight |
|---|---|---|---|---|---|---|
| 50 | None | 0 | 0 | 32.1 | 7.2 | 1.7 |
| 51 | 4,4'-thiobis(6-tert-butyl-o-cresol) | 0 | 1 | 7.9 | 1.9 | 0.54 |
| 52 | 2,2'-thiobis(6-tert-butyl-p-cresol) and di-sec-butyl phosphonate. | 0.03 | 0.25 | 1.6 | 0.26 | 0.07 | di(2-ethylhexyl) adipate, di(2-ethylhexyl) azelate, di(1-methyl-4-ethyloctyl) glutarate, diisoamyl adipate, di(2-ethylhexyl) glutarate, di(2-ethylbutyl) adipate, ditetradecyl sebacate and di(2-ethylhexyl) pinate.

The preferred diesters are generally prepared by esterifying one mole of a dicarboxylic acid having the general formula:

$$HOOC(CH_2)_xCOOH$$

where $x$ is an integer of from 2 to 8, with 2 moles of a branched chain alcohol containing at least 4 carbon atoms. Typical are the reactions of succinic, glutaric, adipic, pimelic, suberic or azelaic acid with sec-amyl alcohol, 3-ethyl butanol, 2-ethyl hexanol or the branched chain secondary alcohols undecanol or tetradecanol.

The preferred diester lubricant fluids have molecular weights ranging from about 300 to about 600 and freezing and pouring points from about −40° to less than about −100° F. Their flash and fire points range from about 300° F. to about 500° F. and their spontaneous ignition temperatures range from about 100° to about 800° F. The diesters made by reaching a dicarboxylic acid with a branched chain alcohol have been found to have superior viscometric properties as compared with diesters made by reacting dihydric alcohols with monocarboxylic acids and thus, diesters prepared by the former method are preferred in formulating the lubricant compositions of this invention.

The diester oils may be formed by the reaction of a polycarboxylic acid with a mono-hydric alcohol, the reaction of a polyhydric alcohol with a mono-carboxylic acid, reaction between a polyhydric alcohol with a polycarboxylic acid, or combinations of the above reactions; for example, reaction of a polycarboxylic acid with a glycol and a mono-hydric alcohol, reaction of a glycol with a polycarboxylic acid and a mono-carboxylic acid, or the reaction of a glycol, a mono-hydric alcohol, a polycarboxylic acid and a mono-carboxylic acid. The acids may be mono-carboxylic aliphatic acids such as, propionic acid, valeric acid, 2-ethyl enanthic acid, 2,2-dipropyl butyric acid or 3-(2-methylhexyl) valeric acid. They may contain unsaturated linkages, such as, in senecioic acid, sorbic acid, or angelic acid; they may be polycarboxylic aliphatic acids such as succinic acid, glutaric acid, azelaic acid, 5-octene-1,8-dicarboxylic acid, or 3-hexene-2,3,4-tricarboxylic acid, and they may be aromatic or cycloaliphatic acids, such as cyclohexaneacetic acid, 1,4-cyclopentylenebis acetic acid, phthalic acid, hemimellitic acid, and terephthalic acid.

The alcohols used in preparing the polyester lubricant base materials may be aliphatic mono-hydric alcohols such as propanol, 2-ethyl-3-hexenol, 2-ethyl-4-propyl heptanol, 2-butenol, or 2-methyl propanol. They may be polyhydric aliphatic alcohols, such as 1,6-hexamethylene glycol, 1,10-decamethylene glycol, 2-hexene-1,6-diol, and 1,6-heptylene glycol, and they may be mono or polyhydric alicyclic or aromatic alcohols, such as 4-[m-(2-hydroxyethyl) phenyl] butanol, 3-(2-hydroxyethyl) cyclohexanebutanol, p-(hydroxymethyl) phenethyl alcohol, α-methyl-p-xylene-α,α'-diol, 1,4-cyclohexane-α,α'-diethyl-dimethanol, 2,3-bis(4-hydroxybutyl)benzyl alcohol, 4,4'-[3-(3-hydroxyhexyl)-o-phenylene] dibutanol, and 5-[3-(3-hydroxypropyl) cyclopenta-2,4-dienylene] 3-ethyl amyl alcohol.

Another class of synthetic lubricants which achieve enhanced oxidative stability by the practice of this invention includes the "silicone" lubricants. The term "silicone" as used in the specification and claims of this application is defined as a synthetic compound containing silicon and organic groups. In naming specific compounds, the nomenclature system recommended by the American Chemical Society Committee on Nomenclature, Spelling, and Pronunciation (Chem. Eng. News, 24, 1233 (1946)) will be used. Thus, the compounds which have the —Si—O—Si— linkages are the siloxanes. Derivatives of silane, $SiH_4$, in which one or more of the hydrogens in silane are replaced with organic groups are termed the silanes. Silicates and silicate ester compounds are named as oxy derivatives of silane and are called alkoxy or aryloxy silanes.

The silicone oils and greases serving as the base medium for the lubricant compositions of the invention include the polysiloxane oils and greases of the type, polyalkyl-, polyaryl-, polyalkoxy-, and polyaryloxy-, such as polydimethyl siloxane, polymethylphenyl siloxane, and polymethoxyphenoxy siloxane. Further included are silicate ester oils, such as tetraalkyloxy and tetraaryloxy silanes of the tetra-2-ethylhexyl and tetra-p-tert-butylphenyl types, and the silanes. Also included are the halogen substituted siloxanes, such as the chlorophenyl polysiloxanes.

The polyalkyl, polyaryl, and polyalkyl polyaryl siloxanes are the preferred types of base medium for the silicon-containing lubricant compositions of the invention because of their high oxidative stability over a wide temperature range. The polyalkyl siloxanes, such as the dimethyl polysiloxane, are slightly preferred over the polyaryl, and polyalkyl polyaryl siloxanes because they show the least change in viscosity over a wide temperature range.

Certain halogen containing organic compounds have physical properties which render them particularly well suited as lubricants. Ordinarily, the halogen is either chlorine or fluorine. Typical of the chlorinated organic compounds suitable as lubricants are the chlorodiphenyls, chloronaphthalenes, chlorodiphenyl oxides and chlorinated paraffin waxes.

The fluorocarbon lubricants which are enhanced by this invention are linear polymers built up of a recurring unit which is

The fluorocarbon oils and greases are very stable chemically and have high thermal stability. These desirable physical properties appear to be closely related to the bond distances occurring in the fluorocarbon polymeric molecule, which may also contain chlorine bonded to carbon.

Polyalkylene glycol lubricants which are benefited by the practice of this invention are ordinarily the reaction product of an aliphatic alcohol with an alkylene oxide. The preferred alkylene oxides are ethylene oxide and propylene oxide. Depending upon the alcohol employed and the molecular weight of the compound, the polyalkylene glycol lubricants may be either water insoluble or water soluble. The molecular weights of these polymers may vary from about 400 to over 3,000. In general, the polyalkylene glycol lubricants are characterized by high viscosity indices, low API gravities, low pour points and they have the general formula:

$$R—(—O—C_nH_{2n})_xOH$$

where $n$ is small integer and depends upon the alkylene oxide employed and $x$ is a large integer from about 10 to about 100 depending upon the molecular weight of the finished lubricant and R represents the hydrocarbon group derived from the particular aliphatic alcohol employed.

Another important class of synthetic materials which are enhanced by the practice of this invention are phosphate esters which are, in general, prepared by the reaction of an organic alcohol with phosphoric acid and have the general formula:

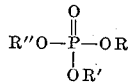

where R, R' and R'' represent either hydrogen or an organic radical and where at least one of the groups represented by R, R' and R'' is an organic radical. Typical of these materials is tricresylphosphate. The phosphate esters are in general characterized by excellent fire resistant properties and high lubricity. However, their thermal stability is such that they are ordinarily unsuited for high temperature applications above about 300° F. Other examples of phosphate esters include: tris(2-chloro-1-methylethyl) phosphate; tri-n-butyl-phosphate; tris(2-ethylhexyl) phosphate; triphenyl phosphate; tris(p-chlorophenyl) phosphate; diethyl m-tolyl phosphate; p-chlorophenyl dimethyl phosphate; tris (2-n-butoxyethyl) phosphate; dimethyl-m-tolyl phosphate; di-n-propyl-m-tolyl phosphate; di-n-butyl phenyl phosphate; 1,3-butylene β-chloroisopropyl phosphate; methyl-di-m-tolyl phosphate; bis(2-chloro-1-methylethyl) m-tolyl phosphate; dimethyl 3,5-xylyl phosphate; 4-chloro-m-tolyl dimethyl phosphate; 2-ethyl-1-n-propyltrimethylene methyl phosphate; 4-chloro-m-tolyl 1-methyltrimethylene phosphate; dimethyl n-octyl phosphate, and the like.

The synthetic base greases used in formulating lubricant compositions of the invention are formed by admixing a soap with an oil of any of the types described above. Such soaps are derived from animal or vegetable fats or fatty acids, wool grease; rosin, or petroleum acids. Typical examples are lead oleate, lithium stearate, aluminum tristearate, calcium glycerides, sodium oleate and the like. In addition, the polyester greases may contain unreacted fat, fatty acids, and alkali; unsaponifiable matter including glycerol and fatty alcohols; rosin or wool grease; water; and certain additives which may function as modifiers or peptizers.

In formulating the grease compositions of this invention, greases prepared by admixing a lithium soap with the polyester oils are preferred as they have superior oxidative stability as compared with greases formulated with other soaps, such as the sodium calcium or lead soaps.

In preparing the improved lubricant compositions of this invention, an appropriate quantity of phenol sulfide and phosphonate are blended with the diester oil to be stabilized. If desired, preformed concentrated solutions of the stabilizer in the base lubricant can be prepared and then subsequently diluted with additional lubricant to the desired concentration. An advantage of this invention is the fact that the additives are easily and rapidly blended with the base oil. An additional advantage of this invention is that the additives are compatible with the usual additives that are frequently used to fortify lubricant compositions, such as detergent-dispersants, viscosity index improvers, dyes, anti-rush additives, anti-foaming agents and the like.

The following examples illustrates various specific embodiments of this invention.

EXAMPLE 53

With 100,000 parts of di-(sec-amyl) sebacate having a viscosity of 210° F. of 33.8 Saybolt Universal seconds (SUS), a viscosity index of 133 and a molecular weight of 342.5 is blended 100 parts (0.1 percent) of 2,2'-thiobis (4-methyl-6-tert-butylphenol), and 0.05 weight percent of phosphorus as diamyl phosphonate. The resulting diester lubricant possesses greatly enhanced resistance against oxidative deterioration.

EXAMPLE 54

To 100,000 parts of di-(2-ethylhexyl) sebacate having a viscosity at 210° F. of 37.3 SUS, a viscosity index of 152 and a molecular weight of 426.7 is added 1000 parts (1 percent) of 2,2'-thiobis(4-ethyl-6-tert-butyl phenol), and 0.3 weight percent phosphorus as di-sec-hexyl phosphonate. After mixing, the resultant diester lubricant possesses greatly enhanced oxidation resistance.

EXAMPLE 55

To 100,000 parts of di-(2-ethylhexyl)adipate having a viscosity at 210° F. of 34.2 SUS, a viscosity index of 121 and a molecular weight of 370.6 is added 2000 parts (2 percent) of 2,2'-trithiobis(4,6-di-tert-butyl phenol), and 1.2 weight percent phosphorus as di-dodecyl phosphonate. After mixing, the resultant diester lubricant possesses outstanding resistance against oxidative deterioration.

EXAMPLE 56

Three parts of 4,4'-dithiobis(2-methyl-6-tert-octyl phenol), and 0.75 weight percent phosphorus as diethyl phosphonate, are blended and mixed with 197 parts of a grease comprising 12.5 percent of lithium stearate, 1 part of polybutene (12,000 molecular weight), 2 percent of calcium xylyl stearate and 84.5 percent of di(2-ethylhexyl) sebacate, to prepare an improved grease of this invention.

EXAMPLE 57

Blended with 750 parts of diisooctyl adipate having a viscosity of 35.4 SUS at 210° F., a viscosity of 57.3 SUS at 100° F., a viscosity of 3,980 SUS at —40° F., a viscosity of 22,500 at —65° F.; its viscosity index is 143, its ASTM pour point is below —80° F. and its specific gravity (60° F./60° F.) is 0.926, are one part of a phenol sulfide prepared from p-tert-butyl phenol and sulfur monochloride and 0.5 part of phosphorus as di-sec-butyl phosphonate.

EXAMPLE 58

Thirty parts of 2,2'-thiobis(4,6-di-tert-amyl phenol) and 50 parts of phosphorus as dimethyl phosphonate are mixed with 10,000 parts of a grease comprising 11 percent of lithium stearate, 1 percent of polybutene (12,000 molecular weight), 1 percent of sorbitan monooleate, 86.6 percent of di[1-(2-methylpropyl)-4-ethyloctyl] sebacate.

EXAMPLE 59

One part of 4,4'-thiobis(2-methyl-6-tert-butyl phenol) and 0.5 part of phosphorus as methyl ethyl phosphonate, are blended with 100 parts of a polymethylpolyphenyl siloxane grease of medium weight consistency having a penetration of 240–280 (ASTM–217–48), a minimum melting point of 400° F. and a serviceable temperature range of from —30 to 400° F. (This siloxane grease is sold under the trade name "Dow-Corning 44.")

EXAMPLE 60

To a siloxane fluid having a viscosity of 71 centistokes at 25° C. and 24 centistokes at 75° C., a specific gravity of 1.03 at 25° C., a freezing point of —70° C. and a flash point of 540° F., which is composed of a halogen substituted polyphenylpolymethyl siloxane is added sufficient 4,4'-trithiobis(2,6-di-tert-butyl phenol) to give a composition containing 1.5 percent of this additive and sufficient diethyl phosphonate to give a composition containing 0.65 percent phosphorus. This oil has an extremely high degree of resistance against oxidative deterioration due to the presence of the additive of this invention.

EXAMPLE 61

To a poly(trifluorochloroethylene) having the formula $(CF_2CFCl)_x$ and an average molecular weight of 880, pour point of 5° C. and a viscosity of 45 centistokes at 160° F. is added 1.25 percent of 2,2'-thiobis(4-methyl-6-tert-butyl phenol), and sufficient dimethyl phosphonate to give one percent phosphorus to prepare an improved lubricant of this invention.

EXAMPLE 62

A composition consisting of 0.6 percent phenol sulfide prepared from a mixture of p-tert-butyl phenol and 2,4-di-tert-butyl phenol by reaction with sulfur dichloride, and 0.3 percent phosphorus as didecyl phosphonate is prepared by blending an appropriate quantity of these compounds with a fluorocarbon grease having a penetration of 267 millimeters at 77° F., 285 millimeters at 100° F. and 300 millimeters at 125° F. (ASTM–217–48); and a dropping point of at least 400° F. (ASTM–D–566–42). This grease is commercially available under the trade name "Fluorolube GR–544."

EXAMPLE 63

To a polyalkylene glycol oil lubricant having a viscosity index of 148, ASTM pour point of −55° F., a flash point of 300° F., a specific gravity of 0.979 and a Saybolt viscosity of 135 at 100° F. is added one percent of 4,4'-thiobis(2-methoxy-6-isopropyl phenol) and 0.5 weight percent phosphorus as diisopropyl phosphonate, to prepare an extremely oxidation resistant polyalkylene glycol lubricant.

EXAMPLE 64

An improved lubricant of this invention comprising a chlorinated organic compound is prepared by admixing 0.5 percent of 2,2'-thiobis(4-ethoxy-6-tert-octyl phenol), and 0.25 weight percent phosphorus as dimethyl phosphonate with a chlorodiphenyl oil having a distillation range of from 554 to 617° F., a Saybolt viscosity at 100° F. of about 49, a pour point of −30° F. and a specific gravity of about 1.267.

EXAMPLE 65

An improved hydraulic fluid and lubricant according to this invention is prepared by adding 2 percent of 4,4'-dithiobis[2-(α-methylbenzyl)-6-tert-butyl phenol] and one percent phosphorus as dimethyl phosphonate to tricresyl phosphate.

The phenol sulfide-phosphonate mixtures of this invention very effectively enhance the oxidation resistance of such diester oils as diethyl oxalate; di-sec-butyl malonate; di-(2-hexyl) succinate; di-(isoheptyl) pimelate; di-(3-decyl) seberate; di-sec-amyl glutarate; di-(isobutyl) glutarate; di-(2-ethylbutyl) glutarate; di-(2-ethylhexyl) glutarate; di-sec-amyl adipate; di-(3-methylbutyl) adipate; diethyl adipate, di-2-ethylhexyl adipate; di-sec-amyl azelate, di-(isobutyl) azelate; di-(2-ethylbutyl) azelate; di-(2-ethylhexyl) azelate; di-sec-amyl sebacate; di-sec-butyl sebacate; di(2-ethylhexyl) sebacate; the glutarates; adipates, azelates and sebacates of branched chain secondary alcohols, such as undecanol, tetradecanol; etc., and, in general, diesters of the type described above and in the literature as useful for synthetic lubricant purposes.

In the compositions of this invention effective use can be made of other additives which are known to the art, such as other inhibitors, detergent-dispersants, pour point depressants, viscosity index improvers, anti-foam agents, rust inhibitors, oiliness of film strength agents, dyes, and the like. Of the inhibitors which can be effectively used with synthetic lubricants in combination with the additives of this invention are sulfurized sperm oil, sulfurized terpenes, sufurized paraffin wax olefins, alkyl phenols, lecithin, neutralized dithiophosphonates, phosphorus pentasulfide-terpene reaction products, diphenylamine, phenylnaphthyl amine, β-naphthol, pyrogallol, and the like. Typical of the detergent additives that can be used in the compositions of this invention are metallic soaps of high molecular weight acids, such as aluminum naphthenates, calcium phenyl stearates, calcium alkyl salicylates, alkaline earth metal petroleum sulfonates, metal salts of wax-substituted phenol derivates and the like. Of the viscosity index improvers and pour point depressants, effective use can be made of polymers of the esters of methacrylic acids and higher fatty alcohols and the corresponding polymers of esters of acrylic acid and higher fatty alcohols. These and other additives which can be employed in the compositions of this invention will now be well know to those skilled in the art.

As noted above, the compounds of this invention are also excellent antioxidants for saturated hydrocarbon polymers.

Polyethylene and polypropylene are, for example, hydrocarbon polymers derived from the polymerization of ethylene and propylene. This polymerization can be accomplished by a great variety of methods which lead to products of diverse properties. Polymers of any nature may advantageously be utilized for preparing compositions according to the present invention. The polymers which are employed may, for example, be similar to those which may be obtained by polymerizing ethylene in a basic aqueous medium and in the presence of polymerization favoring quantities of oxygen under relatively high pressures in excess of 500 or 1,000 atmospheres at temperatures between 150 and 275° C. Or if desired, they may be similar to the essentially linear and unbranched polymers ordinarily having greater molecular weights which may be obtained under relatively low pressures of 1 to 100 atmospheres using such catalysts to polymerize the ethylene as mixtures of strong reducing agents and compounds of Groups IVB, VB and VIB metals of the periodic system; chromium oxide on silicated alumina; hexavalent molydenum compounds; and charcoal supported nickel-cobalt. The polymer which results from these various polymerization processes may have a molecular weight in the range from 1300 to over 1,000,000 depending on the particular conditions of polymerization employed.

EXAMPLE 66

The benefits derived from the practice of this invention are demonstrated by comparative oxidation tests of uninhibited polyethylene and polyethylene containing an antioxidant system of this invention. These tests are conducted as follows: The selected amount of antioxidant is blended with the polyethylene by milling a weighed quantity of plastic pellets on a warm roll-mill. The weighed quantity of antioxidant is added to the mill after the polyethylene has been pre-milled for a short period of time. The plastic containing the antioxidant is then added in weighed quantity to a standard size vessel and melted to give a surface of reproducible size. The vessel is then inserted into a chamber which may be sealed and which is connected to a capillary tube leading to a gas buret and leveling bulb. The apparatus is flushed with oxygen at room temperature, sealed, and the temperature is raised to 150° F. The oxygen pressure is maintained at one atmosphere by means of the leveling bulb. The oxygen uptake at the elevated temperature is recorded for the duration of the test. This procedure has been adopted since it has been found that many compounds may inhibit the oxidation for a certain induction period after which time a very sharp increase in the rate of oxygen uptake occurs indicating that the antioxidant has been exhausted. A sample of the polyethylene was tested unihibited. Another sample was tested with 0.2 percent of 4,4'-thiobis(2-methyl-6-tert-butyl phenol). A thrid sample contained an antioxidant mixture of this invention; namely, 0.2 percent of 4,4'-thiobis(2-methyl-6-tert-butyl phenol) and 0.17 percent of bis(2-ethylhexyl)phosphonate. The induction period of the sample containing the antioxidant system of this invention had an induction period of 285 hours, whereas the sample containing 4,4'-thiobis(2-methyl-6-tert-butyl phenol) alone had an induction period of only 190 hours. The uninhibited sample had no induction period and took up oxygen immediately. After 20 hours of heating the uninhibited sample has absorbed over 45 ml. of oxygen.

There are several methods available for preparing the inhibited hydrocarbon polymer compositions of this invention. Thus the blending of the additives of this invention, with a polymer such as, for example, polyethylene, may be carried out on open rolls, on internal mixers or may be accomplished by mixing with extrusion. It is also possible to prepare concentrated batches of the polymer containing excessive amounts of the additive and then mix the concentrate with additional polymer to prepare a composition of this invention. The preferred method of compounding the polymers is by milling on heated open rolls at slightly elevated temperatures by methods well-known to the art. The temperature range employed is sometimes critical as certain polyethylenes will not melt at low temperatures and tend to stick to the rolls at high temperatures. The additive may be initially mixed with the polymer in the dried state or may be first dissolved in a suitable solvent, then sprayed on the polymer and milled in.

Examples of the hydrocarbon polymer compositions of this invention prepared as described above follow. All parts and percentages are by weight in these examples.

EXAMPLE 67

To 1,000 parts of polyethylene produced by oxygen catalyzed reaction under a pressure of 20,000 atmospheres and having an average molecular weight of 40,000 is added and mixed 2 parts of 4,4'-dithiobis(2,6-diisopropyl phenol) and 0.025 percent phosphorus as diamyl phosphonate. The resulting composition has a greatly increased oxidative stability.

EXAMPLE 68

To 100 parts of polyisobutylene having an average molecular weight of 100,000 is added 0.5 part of 4,4'-trithiobis(2-methyl-6-tert-butyl phenol) and 0.3 percent phosphorus as dimethyl phosphonate. The oxidative stability of the polymer is greatly increased by the addition of this compound.

EXAMPLE 69

A linear polyethylene having a high degree of crystallinity (up to 93 percent) and below one ethyl branched chain per hundred carbon atoms, a density of about 0.96 gram per milliliter and which has about 1.5 double bonds per 100 carbon atoms is treated with $50 \times 10^{-6}$ roentgens of $\beta$-radiation. To the thus irradiated polymer is added 0.1 percent of 4,4'thiobis(2-chloro-6-tert-butyl phenol); and 0.05 percent phosphorus as diisopropopyl thio phosphonate. The resulting product has improved stability characteristics.

EXAMPLE 70

To a polyethylene having an average molecular weight of 1500, a melting point of 88–90° C. and a specific gravity of 0.92 is added one percent of 4,4'-thiobis(2-isopropyl-6-cyclohexyl phenol) and 0.6 percent phosphorus as dimethyl thionophosphonate. After milling in the antioxidant an extremely oxidation resistant product results.

EXAMPLE 71

Two parts of 2,2'-thiobis(4-tert-butyl-6-tert-amyl phenol) and 1.0 percent phosphorus as diphenyl phosphonate are added with milling to 100 parts of a low density polyethylene prepared by high pressure polymerization and which has an average molecular weight of about 20,000. The resulting product is vastly improved in its oxidative stability.

EXAMPLE 72

To a polyisobutylene polymer having an average molecular weight of 35,000 is added sufficient 4,4'-thiobis[2,6-di-($\alpha$-methyl benzyl)phenol] to give a composition containing 0.3 percent of the phenol sulfide and 0.05 percent phosphorus as dicresyl phosphonate. The composition has improved antioxidant properties due to the presence of the antioxidant mixture of this invention.

EXAMPLE 73

To 1,000 parts of a solid polypropylene polymer having a density of 0.905 and a Rockwell hardness greater than 85, in which isotactic is added and blended to 5 parts of 2,2'-trithiobis(4,6-dimethyl phenol) and 0.5 percent phosphorus as dimethyl phosphonate.

EXAMPLE 74

To an isotactic polypropylene having a tensile strength greater than 4,300 p.s.i. and a compressive strength of about 9,000 p.s.i. is added sufficient 4,4'-thiobis(2-isopropyl-6-tert-butyl phenol) to give a composition containing 1.5 percent of the phenol sulfide and sufficient diisobutyl phosphonate to give 0.85 percent phosphorus.

EXAMPLE 75

To a wax-like polypropylene having a melting point above 130° C. and a molecular weight of about 4,000, a density of 0.913 is added 0.2 percent of 4,4'-thiobis(2,6-diisopropylphenol) and 0.05 percent phosphorus as dioctyl phosphonate. The antioxidant is added to the polypropylene in the molten state and the mixture is allowed to solidify into the desired shape. A polypropylene product of outstanding oxidative stability results.

In addition to the additive of this invention saturated hydrocarbon polymers may contain other compounding and coloring additives including minor proportions of carbon black, elastomers, polyvinyl compounds, carboxylic acid esters, urea-aldehyde condensation products, flame retarding agents such as antimony trioxide and chlorinated hydrocarbons and various pigment compositions designed to impart color to the finished product.

Other hydrocarbon polymers which are stabilized against oxidative deterioration according to this invention include natural rubber, GR–S and GR–N rubbers, butyl rubber, methyl rubber, polybutene rubber, butadiene rubbers, piperylene rubbers, dimethylbutadiene rubbers, polystyrene, polybutadiene, polyisobutylene, polyethylene, isobutylene-styrene copolymer and, in general elastomeric hydrocarbon polymers which are normally susceptible to oxidative deterioration. Such polymers are well known in the art and besides being susceptible of oxidative deterioration are characterized by having molecular weights above about 10,000. The problem resulting from heat, light and catalyst promoted oxidative deterioration in such hydrocarbon polymers is intensified because of free radical formation within the polymers. This leads to various forms of physical and chemical degradation such as chain scission, autocatalytic oxidation, reduction in molecular weight and loss of original physical properties. The net result is that the desirable useful and necessary properties of the polymers which are associated with their original chemical structure and molecular weights are lost to a greater or lesser extent unless the polymers are stabilized against such deterioration.

Typical stabilized hydrocarbon polymers of this invention are illustrated by the following specific examples wherein all parts and percentages are by weight.

EXAMPLE 76

To a synthetic rubber master batch comprising 100 parts of GR–S rubber having an average molecular weight of 60,000, 5 parts of mixed zinc propionate-stearate, 50 parts of carbon black, 5 parts of road tar, 2 parts of sulfur and 1.5 parts of mercaptobenzothiazole is incorporated 1.5 parts of 4,4'-thiobis[2-isopropyl-6-($\alpha,\alpha$-dimethylbenzyl)phenol] and 0.45 percent phosphorus as dimethyl phosphonate. This batch is then cured for 60 minutes at 45 pounds per square inch of steam pressure.

EXAMPLE 77

Five percent of 4,4'-dithiobis(2,6-di-tert-butyl phenol) and 1.25 percent phosphorus as diethyl thionophosphonate are added to a synthetic rubber master batch comprising 100 parts of GR–S rubber having an average molecular weight of 100,000, 5 parts of zinc stearate, 50 parts of carbon black, 5 parts of road tar, 2 parts of sulfur and 1.5 parts of mercaptobenzothiazole. This batch is then cured as described in Example 76.

EXAMPLE 78

Two parts of 4,4'-thiobis[2,6-di-(1,1,3,3-tetramethyl butyl)phenol] and 0.5 percent phosphorus as di-xylyl phosphonate are incorporated in 100 parts of raw butyl rubber prepared by the copolymerization of 90 percent of isobutylene and 10 percent of isoprene and having an average molecular weight of 100,000.

EXAMPLE 79

To a master batch of GR–N synthetic rubber comprising 100 parts of GR–N rubber having an average molecular weight of 75,000, 5 parts of zinc stearate, 50 parts of carbon black, 5 parts of road tar, 2 parts of sulfur and 2 parts of mercaptobenzothiazole is added 2 percent based on the weight of the batch of 4,4'-thiobis(2-bromo-6-tert-butyl phenol), and 0.85 percent phosphorus as di-(phenylphenyl)phosphonate.

EXAMPLE 80

0.25 percent by weight of 4,4'-thiobis(2-methyl-6-tert-butyl phenol) and 0.075 percent phosphorus as diisobutylphosphonate are incorporated in polybutadiene having an average molecular weight of 50,000.

EXAMPLE 81

To natural rubber (Hevea) is added 0.1 percent of 2,2'-thiobis(2-methyl-4-octylphenol) and 0.005 percent phosphorus as didodecylphosphonate.

The above examples illustrate the improved compositions of this invention. Other such compositions and the methods of preparing the same will now be apparent to one skilled in the art.

The stabilizers of this invention are also excellent additives to tetraalkyllead antiknock compositions. The tetraalkyllead antiknock agents which are stabilized according to this invention are represented by such compounds as tetramethyllead, tetraethyllead, tetrapropyllead, dimethyldiethyllead, trimethylethyllead, and the like, or mixtures thereof. Such compounds containing from 4 to about 12 carbon atoms, one atom of lead and a plurality of lead-to-carbon bonds, are capable of increasing the octane quality of gasoline when employed therein in antiknock quantities—0.5 to 6.5 grams of lead per gallon. Halogen-containing compounds such as triethyllead bromide may also be stabilized according to this invention.

The scavengers which are preferably, but not necessarily, present in the antiknock compositions of this invention are organic halide compounds which react with the lead during combustion in the engine to form volatile lead halide. The halogen of these scavengers has an atomic weight between 35 and 80; that is, the active scavenging ingredient is chlorine and/or bromine. Such scavengers include carbon tetrachloride, propylene dibromide, 2-chloro-2,3-dibromobutane, 1,2,3-tribromopropane, hexachloropropylene, mixed bromoxylenes, 1,4-dibromobutane, 1,4-dichloropentane, $\beta,\beta'$-dibromodiisopropyl ether, $\beta,\beta'$-dichlorodiethyl ether, trichlorobenzene, dibromotoluenes and in general those disclosed in U.S. Patents 1,592,954; 1,668,022; 2,364,921; 2,479,900; 2,479,901; 2,479,902; 2,479,903; and 2,496,983. In short, the preferred scavengers contain only elements selected from the group consisting of carbon, hydrogen, bromine, chlorine and oxygen. The amount of scavenger used is from about 0.5 to about 2.0 theories, a theory being defined as the quantity required to react with the lead to form lead halide—i.e., 2 atoms of halogen per atom of lead. When we use mixtures of bromine-containing and chlorine-containing scavengers, particularly bromo and chlorohydrocarbons, we can employ concentrations and proportions as described in U.S. Patent 2,398,281. Such concentrations are sufficient to control the amount of deposits formed in the engine.

The tetraalkyllead antiknock compositions of this invention may contain other ingredients such as dyes for identification purposes, metal deactivators, diluents and the like.

Antiknock compositions containing tetraalkyllead antiknock agents are employed by adding them to gasoline to improve the antiknock quality thereof. Such gasolines both before and after addition of the antiknock fluid are benefited by the practice of this invention. Thus gasolines to which have been added a compound of this invention are found to be more stable upon prolonged periods of storage.

The following examples illustrate gasoline embodiments of this invention.

EXAMPLE 82

To 10,000 parts of a grade 115/145 aviation gasoline containing 4.5 ml. of tetraethyllead per gallon which has an initial boiling point of 110° F. and a final boiling point of 330° F. and an API gravity of 71.0° is added .5 percent of 4,4'-thiobis(2-methyl-6-di-butyl phenol) and 0.4 percent phosphorus as dioctyl phosphonate.

EXAMPLE 83

To a gasoline containing 26.6 percent aromatics, 20.8 percent olefins and 52.6 percent saturates and which has an API gravity of 62.1° is added 0.1 percent of 4,4'-thiobis(2,6-diisopropyl phenol) and 0.01 percent phosphorus as diisobutyl thiophosphonate.

Similarly, other additive mixtures of this invention may be added with benefit to gasoline of whatever nature and however processed.

The additive combinations of this invention are also extremely useful in inhibiting and stabilizing non-petroleum fats and oils normally subject to the deteriorating effect of oxidative rancidity. In particular, compounds of this invention are excellent stabilizers for animal fats and oils, especially lard, against the effects of rancidity.

In formulating the stabilized non-petroleum fats and oils of this invention, the additive or combination of additives is incorporated by appropriate means into the substrate to be stabilized. Thus, in the case of animal, vegetable and fish oils, the additive or combination of additives is added in appropriate quantity and the resulting mixture agitated to insure homogeneity. Where the substrate is a solid at room temperatures—e.g., fats, butter, etc.—the mixing is preferably carried out at temperatures above the melting point of the substrate. When a combination of additives is used, they can be mixed with the substrate as a preformed mixture or can be separately blended therewith in either order. Generally speaking, it is desirable to first dissolve the additive combination in high concentration in a small portion of the material to be stabilized. The resulting concentrated solution then blended with the remaining bulk. Another way of facilitating the formulation of the composition of this invention is to predissolve the additive or combination of additives in a suitable solvent, such as ethanol, glycerol, propylene glycol, etc. and then mix the resultant solution with the material to be stabilized. However, the preferred way of formulating the compositions of this invention is to predissolve the additive mixture in a fatty acid partial ester of a polyhydroxy compound, notably a monoglyceride, and then blend this mixture with the material to be stabilized. The nature of these monoglyceride compositions is well known in the art and may be made from either animal or vegetable fats, with or without previous hydrogenation. These compositions generally contain about 40 percent of the monostearyl, monooleayl, and/or monopalmityl glycerides or mixtures thereof with the balance comprising a mixture of di- and tri-glycerides. Molecularly distilled monoglycerides may also be used for this purpose. These compositions will be apparent from the following examples.

EXAMPLE 84

With 1,000 parts of melted lard is mixed 1 part (0.1 percent) of 4,4'-thiobis(2,6-di-tert-butyl phenol) and 0.05 percent phosphorus as diisopropyl phosphonate. After cooling the lard can be stored for long periods of time without the development of rancidity.

EXAMPLE 85

With 5,000 parts of cottonseed shortening is blended 5 parts (0.1 percent) of 4,4'-trithiobis(2-isopropyl-6-tert-butyl phenol) and 0.1 percent phosphorus as diamyl phosphonate. The resulting shortening has improved resistance against oxidative rancidity.

EXAMPLE 86

To 10,000 parts of corn oil are added with stirring 20 parts (0.2 percent) of 2,2'-thiobis(4,6-di-tert-amyl phenol) and 2 parts (0.02 percent) of phosphorus as dimethyl phosphonate. The resulting corn oil has improved storage stability characteristics.

Preparation of the phosphonates used in this invention, such as diisobutyl phosphonate, di(2,4-dichlorocyclohexyl) phosphonate, di(3-chloro-4-methylphenyl) phosphonate, etc., follows the general procedures described in Industrial and Engineering Chemistry, 49, 1871 (1957). To prepare the phenol sulfides, in general a phenol is reacted with a sulfur halide, particularly sulfur dichloride according to methods generally known.

Among the phenol sulfites applicable to this invention are 4,4'-thiobis[2-tert-octyl-6-($\alpha$-ethyl-$\alpha$-methylbenzyl) phenol],
4,4'-dithiobis[2-sec-eicosyl-6-($\alpha$-methylbenzyl)phenol],
4,4'-thiobis[2-($\alpha,\alpha$-diisopropyl-p-nonylbenzyl)-6-($\alpha,\alpha$-diisopropyl-p-ethylphenylbenzyl)phenol],
4,4'-trithiobis[2-tert-amyl-6-($\alpha,\alpha$-dimethylbenzyl)phenol],
4,4'-thiobis[2-methyl-6-($\alpha$-ethylbenzyl)phenol],
4,4'-dithiobis[2-ethyl-6-($\alpha$-diethyl-3-isobutylbenzyl) phenol],
4,4'-thiobis[2-tert-butyl-6-($\alpha$-propyl-4-phenylbenzyl) phenol],
4,4'-thiobis[2-isopropyl-6-($\alpha,\alpha$-dipropyl-3-hexylbenzyl) phenol],
4,4'-trithiobis[2-hexyl-6-($\alpha$-ethyl-$\alpha$-methylbenzyl) phenol], and
4,4'-dithiobis[2,6-di($\alpha,\alpha$-diethyl-4-methylbenzyl) phenol],
4,4'-thiobis(2-tert-octyl-6-cyclohexylphenol),
4,4'-dithiobis(2-sec-eicosyl-6-cyclohexylphenol)
4,4'-thiobis[2-($\alpha,\alpha$-diisopropyl-p-nonylbenzyl)-6-(p-isopropyl cyclohexyl]phenol,
4,4'-trithiobis[2-tert-amyl-6-(o-methylcyclohexyl) phenol],
4,4'-thiobis(2-methyl-6-cyclohexylphenol),
4,4'-trithiobis(2-ethyl-6-cyclohexylphenol),
4,4'-trithiobis(2-tert-butyl-6-cyclohexylphenol),
4,4'-dithiobis(2-isopropyl-6-cyclohexylphenol), and
4,4'-thiobis[2-hexyl-6-(p-cyclohexylcyclohexyl)phenol],
2,2'-thiobis(2-methyl-6-tert-butylphenol),
2,2'-thiobis(4-methyl-6-isopropylphenol),
2,2'-thiobis(4-ethyl-6-isopropylphenol),
2,2'-thiobis(4-n-propyl-6-isopropylphenol),
2,2'-thiobis(4,6-diisopropylphenol),
2,2'-thiobis(4-n-butyl-6-isopropylphenol),
2,2'-thiobis(4-sec-butyl-6-isopropylphenol),
2,2'-thiobis(4-isobutyl-6-isopropylphenol) and
2,2'-thiobis(4-tert-butyl-6-isopropylphenol),
2,2'-thiobis(4-ethyl-6-tert-butylphenol),
2,2'-thiobis(4-n-propyl-6-tert-butylphenol),
2,2'-thiobis(4-isopropyl-6-tert-butylphenol),
2,2'-thiobis(4-n-butyl-6-tert-butylphenol),
2,2'-thiobis(4-sec-butyl-6-tert-butylphenol),
2,2'-thiobis(4-isobutyl-6-tert-butylphenol),
2,2'-thiobis(4,6-di-tert-butylphenol),
2,2'-thiobis(4-methyl-6-sec-butylphenol),
2,2'-thiobis(4-ethyl-6-sec-butylphenol),
2,2'-thiobis(4-n-propyl-6-sec-butylphenol),
2,2'-thiobis(4-isopropyl-6-sec-butylphenol),
2,2'-thiobis(4-n-butyl-6-sec-butylphenol),
2,2'-thiobis(4,6-di-sec-butylphenol),
2,2'-thiobis(4-isobutyl-6-sec-butylphenol),
2,2'-thiobis(4-tert-butyl-6-sec-butylphenol),
4,4'-thiobis(2,6-di-tert-butylphenol),
4,4'-thiobis(2-methyl-6-isopropylphenol),
4,4'-thiobis(2-ethyl-6-sec-butylphenol),
4,4'-thiobis(2,6-diisopropylphenol),
4,4'-thiobis(2-methyl-6-tert-butylphenol) and the like.

As noted above the antioxidant mixtures of this invention may be pre-mixed before addition to the material to be protected. Examples of such pre-formed mixtures follow.

EXAMPLE 87

Sufficient 4,4'-thiobis(6-tert-butyl-o-cresol) and bis(2-ethylhexyl) phosphonate are blended together to give a composition containing one part of the thioether per part of phosphorus.

EXAMPLE 88

4,4'-thiobis(2,6-di-tert-butylphenol) (di(3,5-di-tert-butyl-4-hydroxyphenyl) thioether) and dimethyl phosphonate (dimethyl hydrogen phosphite) are compounded into a mixture containing 800 parts of the phenol per part of phosphorus.

EXAMPLE 89

A mixture containing 0.067 part of 2,2'-thiobis(6-tert-butyl-p-cresol) per part of phosphorus is prepared by mixing appropriate quantities of 2,2'-thiobis(6-tert-butyl-o-cresol) and di-sec-butyl phosphonate.

EXAMPLE 90

4,4' - dithiobis[2 - methyl - 6 - ($\alpha,\alpha$ - dithmethylbenzyl) phenol] and diamyl phosphonate are mixed in such proportion that the resulting mixture has 4 parts of the phenol per part of phosphorus.

We claim:

1. Organic material normally tending to undergo oxidative deterioration in the presence of air, oxygen or ozone selected from the group consisting of: hydrocarbon mineral oil; liquid synthetic lubricant; automatic transmission fluid having as its primary constituent from about 73.5 to about 97.5 percent by weight of a refined mineral distillate oil with a viscosity between 49 Saybolt Universal seconds at 210° F. and 7000 Saybolt Universal seconds at 0° F. and being lighter than an SAE-10 motor oil; normally solid polyolefin polymer; gasoline; tetraalkyllead antiknock composition; rubber; and fats and oils of animal and vegetable origin; protected by a small antioxidant quantity of a mixture consisting essentially of a phenol sulfide having the formula

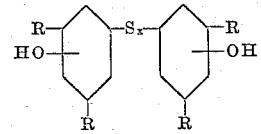

wherein $x$ has a value of from 1–3 and the R's are selected from the group consisting of alkyl groups and alkoxy groups and a dialkyl phosphonate, said dialkyl phosphonate containing only phosphorus, hydrogen, oxygen and carbon atoms, said compositon containing from about 0.01 to about 5 weight percent of said phenol sulfide and from about 0.05 to about 1.5 weight percent of phosphorus as said phosphonate, based on the weight of the material to be protected.

2. The composition of claim 1 wherein said dialkyl phosphonate is dimethyl phosphonate.

3. The composition of claim 2 wherein said phenol sulfide is 4,4'-thiobis(2,6-dialkylphenol).

4. The composition of claim 3 wherein said thiobis phenol is 4,4'-thiobis(6-tert-butyl-o-cresol).

5. The composition of claim 3 wherein said thiobis phenol is 4,4'-thiobis(2,6-di-tert-butylphenol).

6. The composition of claim 2 wherein said phenol sulfide is a 2,2'-thiobis(4,6-dialkylphenol).

7. The composition of claim 6 wherein said thiobis phenol is 2,2'-thiobis(6-tert-butyl-p-cresol).

8. The composition of claim 6 wherin said thiobis phenol is 2,2'-thiobis(4,6-di-tert-butylphenol).

9. The composition of claim 1 wherein said dialkyl phosphonate is diisobutyl phosphonate.

10. The composition of claim 1 wherein said dialkyl phosphonate and said phenyl sulfide are in amounts such that there is from 0.067 part to 1000 parts of said phenol sulfide per part of phosphorus.

11. The composition of claim 1 wherein said organic material is an automatic transmission fluid having as its primary constitutent from about 73.5 to about 97.5 percent by weight of a refined mineral distillate oil with a viscosity between 49 Saybolt Universal seconds at 210° F. and 7000 Saybolt Universal seconds at 0° F. and being lighter than an SAE–10 motor oil.

12. The composition of claim 1 wherein said organic material is a normally solid polyolefin polymer.

13. The composition of claim 1 wherein said organic material is gasoline.

14. The composition of claim 1 wherein said organic material is a tetraalkyllead antiknock composition.

15. The composition of claim 1 wherien said organic material is rubber.

16. The composition of claim 1 wherein the molar ratio of said phosphonate to said phenol sulfide is greater than 1.

17. The composition of claim 16 wherein said dialkyl phosphonate is dimethyl phosphonate.

18. The composition of claim 16 wherein said phenol sulfide is 4,4'-thiobis(6-tert-butyl-o-cresol).

19. Petroleum hydrocarbon mineral oil normally tending to undergo oxidative deterioration containing as a synergistic antioxidant mixture from 0.01 to about 5 weight percent of 4,4'-thiobis(6-tert-butyl-o-cresol) and from about 0.05 to about 1.5 weight percent of dimethyl phosphonate such that the molar ratio of said phosphonate to said o-cresol is greater than 1.

20. The composition of claim 1 wherein said organic material is a liquid synthetic lubricant.

21. Petroleum hydrocarbon mineral oil normally tending to undergo oxidative deterioration containing as a synergistic antioxidant mixture from about 0.01 to about 5.0 weight percent of a phenol sulfide having the formula

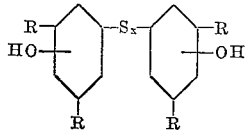

wherein $x$ has a value of from 1–3 and the R's are selected from the group consisting of alkyl groups and alkoxy groups, and from about 0.05 to about 1.5 weight percent of a dialkyl phosphonate containing only phosphorus, hydrogen, oxygen and carbon atoms.

22. The composition of claim 21 wherein said dialkyl phosphonate is dimethyl phosphonate.

23. The composition of claim 22 wherein said phenol sulfide is a 4,4'-thiobis(2,6-dialkylphenol).

24. The composition of claim 23 wherein said thiobisphenol is 4,4'-thiobis(6-tert-butyl-o-cresol).

25. The composition of claim 23 wherein said thiobis phenol is 4,4'-thiobis(2,6-di-tert-butylphenol).

26. The composition of claim 22 wherein said phenol sulfide is a 2,2'-thiobis(4,6-dialkylphenol).

27. The composition of claim 26 wherein said thiobis phenol is 2,2'-thiobis(6-tert-butyl-p-cresol).

28. The composition of claim 26 wherein said thiobis phenol is 2,2'-thiobis(4,6-di-tert-butylphenol).

29. Petroleum hydrocarbon mineral oil normally tending to undergo oxidative deterioration containing from about 0.01 to about 5.0 weight percent of 4,4'-thiobis(6-tert-butyl-o-cresol) and from 0.05 to about 1.5 weight percent of di-sec-butyl phosphonate.

References Cited in the file of this patent

UNITED STATES PATENTS

| | | |
|---|---|---|
| 2,191,996 | Shoemaker et al. | Feb. 27, 1940 |
| 2,290,859 | Burk et al. | July 28, 1942 |
| 2,564,646 | Leistner et al. | Aug. 14, 1951 |
| 2,700,691 | Mayes | Jan. 25, 1955 |
| 2,731,443 | Forman | Jan. 17, 1956 |
| 2,820,766 | Elliott et al. | Jan. 21, 1958 |
| 2,841,619 | Albert | July 1, 1958 |
| 2,985,617 | Salyer et al. | May 23, 1961 |

FOREIGN PATENTS

| | | |
|---|---|---|
| 1,171,286 | France | Sept. 29, 1958 |

OTHER REFERENCES

Kosolapoff: "Organophosphorus Compounds," John Wiley and Sons, Inc., New York, publishers (1950), pages 193–194.

Morawetz: "Industrial and Engineering Chemistry," volume 41, No. 7, July 1949, pages 1442–1447.

Georgi: "Motor Oils and Engine Lubrication," 1950, page 243.

Atkins et al.: "Industrial and Engineering Chemistry," volume 39, No. 4, April 1947, pages 491–497.

UNITED STATES PATENT OFFICE
CERTIFICATE OF CORRECTION

Patent No. 3,145,176                                August 18, 1964

Gordon G. Knapp et al.

It is hereby certified that error appears in the above numbered patent requiring correction and that the said Letters Patent should read as corrected below.

Column 15, Table VIII, under the heading "Additive", and opposite "Run 52", for "2,2'-thiobis(6-tert-butyl-p-cresol)" read -- 4,4'-thiobis(6-tert-butyl-o-cresol) --; column 28, line 28, for "o-cresol" read -- p-cresol --.

Signed and sealed this 2nd day of February 1965.

(SEAL)
Attest:

ERNEST W. SWIDER
Attesting Officer

EDWARD J. BRENNER
                                               Commissioner of Patents